(12) United States Patent
Bourne

(10) Patent No.: US 9,857,016 B2
(45) Date of Patent: Jan. 2, 2018

(54) APPARATUS AND A METHOD FOR SEALING A CONDUIT

(71) Applicant: TREADSTONE OILFIELD SERVICES LTD., Lloydminster (CA)

(72) Inventor: Colin Bourne, Lloydminster (CA)

(73) Assignee: TREADSTONE OILFIELD SERVICES LTD., Lloydminster (CA)

( * ) Notice: Subject to any disclaimer, the term of this patent is extended or adjusted under 35 U.S.C. 154(b) by 220 days.

(21) Appl. No.: 14/759,188

(22) PCT Filed: Jan. 8, 2013

(86) PCT No.: PCT/CA2013/000009
§ 371 (c)(1),
(2) Date: Jul. 2, 2015

(87) PCT Pub. No.: WO2014/107785
PCT Pub. Date: Jul. 17, 2014

(65) Prior Publication Data
US 2015/0338013 A1      Nov. 26, 2015

(51) Int. Cl.
*F16L 55/10* (2006.01)
*F16L 55/18* (2006.01)
(Continued)

(52) U.S. Cl.
CPC ............... *F16L 55/18* (2013.01); *F16K 7/20* (2013.01); *F16L 55/132* (2013.01);
(Continued)

(58) Field of Classification Search
CPC .................. F16L 55/10; F16L 55/124
(Continued)

(56) References Cited

U.S. PATENT DOCUMENTS 2,177,916 A    10/1939   Thomas et al.
2,390,461 A *  12/1945   Racz ............... F16L 55/132
                                                    138/89
(Continued)

FOREIGN PATENT DOCUMENTS

FR        2566873        1/1986
FR        2670558        6/1992
WO    WO2010112067      10/2010

*Primary Examiner* — Patrick F Brinson
(74) *Attorney, Agent, or Firm* — Terrence N. Kuharchuck; Rodman & Rodman LLP

(57) ABSTRACT

An apparatus and a method for selectively sealing a conduit. The apparatus includes a housing, a selectively actuatable seal assembly, a seal assembly carrier for conveying and actuating the seal assembly, and a selectively actuatable connection between the seal assembly and the seal assembly carrier. The method includes providing the apparatus, connecting the housing with a fitting, advancing the seal assembly carrier to position the seal assembly in a conduit, actuating the seal assembly to seal the conduit, actuating the actuatable connection to disconnect the seal assembly from the seal assembly carrier, and retracting the seal assembly carrier. The method may further include advancing the seal assembly carrier to engage the seal assembly, actuating the actuatable connection to connect the seal assembly with the seal assembly carrier, actuating the seal assembly to unseal the conduit, and retracting the seal assembly carrier and the seal assembly from the conduit.

15 Claims, 9 Drawing Sheets

(51) Int. Cl.
*F16L 55/132* (2006.01)
*F16K 7/20* (2006.01)
(52) U.S. Cl.
CPC ...... *Y10T 137/0441* (2015.04); *Y10T 137/598* (2015.04); *Y10T 137/6157* (2015.04)
(58) Field of Classification Search
USPC ................... 138/89, 94; 137/315.27, 315.41; 251/291
See application file for complete search history.

(56) References Cited

U.S. PATENT DOCUMENTS

| | | | |
|---|---|---|---|
| 2,690,612 A | 10/1954 | Scott | |
| 2,784,627 A * | 3/1957 | Mueller | F16L 55/1657 138/97 |
| 2,867,243 A | 1/1959 | Bowan | |
| 3,032,069 A * | 5/1962 | Ficklin | F16L 55/124 137/315.27 |
| 3,140,730 A | 7/1964 | Costes | |
| 3,541,858 A | 11/1970 | Bonczek | |
| 3,841,355 A | 10/1974 | Laner | |
| 4,434,816 A * | 3/1984 | Di Giovanni | F16L 13/148 138/109 |
| 4,597,147 A | 7/1986 | Henry | |
| 5,024,079 A | 6/1991 | Dufort | |
| 5,038,818 A | 8/1991 | Jiles | |
| 5,168,902 A | 12/1992 | Hood | |
| 5,363,881 A | 11/1994 | Larkin | |
| 5,592,965 A | 1/1997 | Rakieski | |
| 5,884,668 A | 3/1999 | Larkin | |
| 5,960,826 A | 10/1999 | Hebblewaite et al. | |
| 6,257,266 B1 | 7/2001 | Valdez | |
| 6,446,662 B1 | 9/2002 | Wagner | |
| 6,508,274 B2 | 1/2003 | Street | |
| 6,581,620 B2 | 6/2003 | Babcock et al. | |
| 6,755,216 B1 | 6/2004 | Mostala | |
| 7,225,836 B2 | 6/2007 | Field | |
| 8,037,904 B2 | 10/2011 | Carnevali | |
| 8,281,818 B1 * | 10/2012 | Vazquez | F16L 55/132 138/89 |
| 9,115,841 B2 | 8/2015 | Bourne | |
| 9,115,851 B2 * | 8/2015 | Varadaraj | F17D 1/16 |
| 2004/0074549 A1 | 4/2004 | Allen | |

* cited by examiner

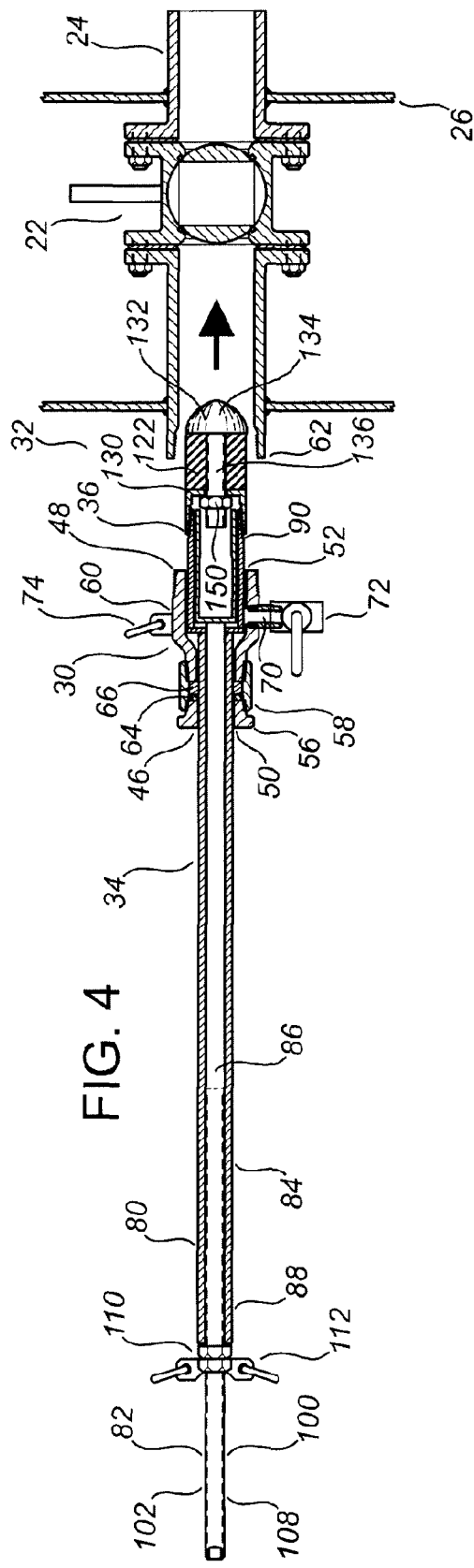
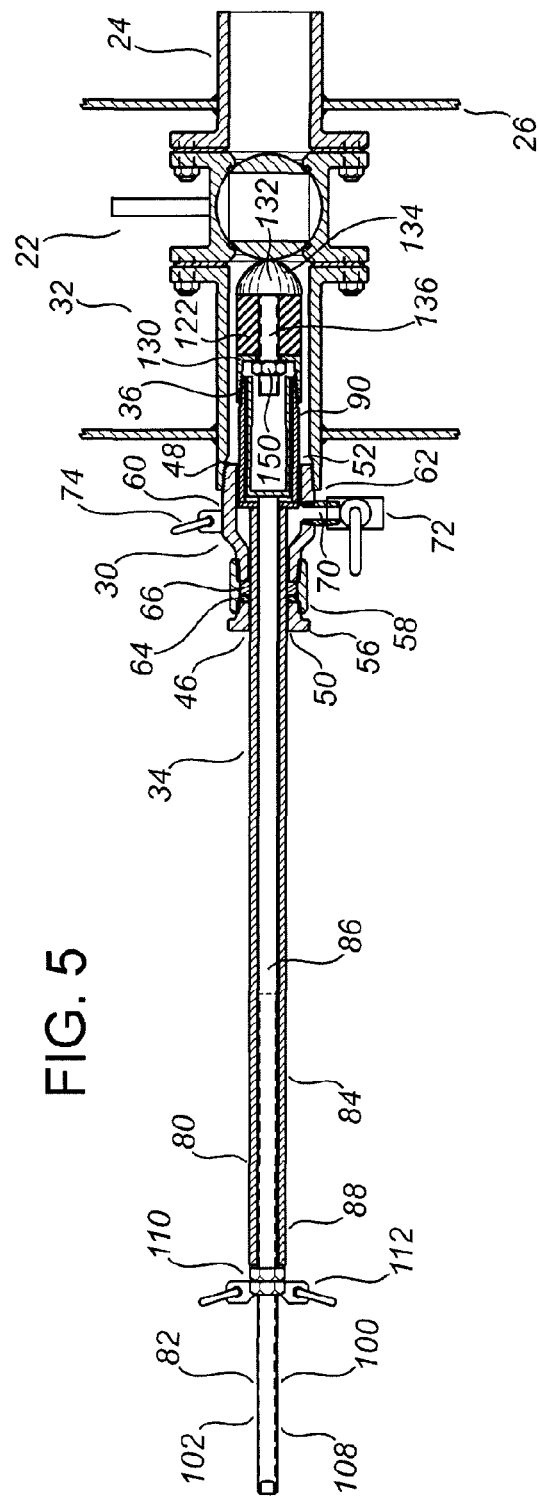

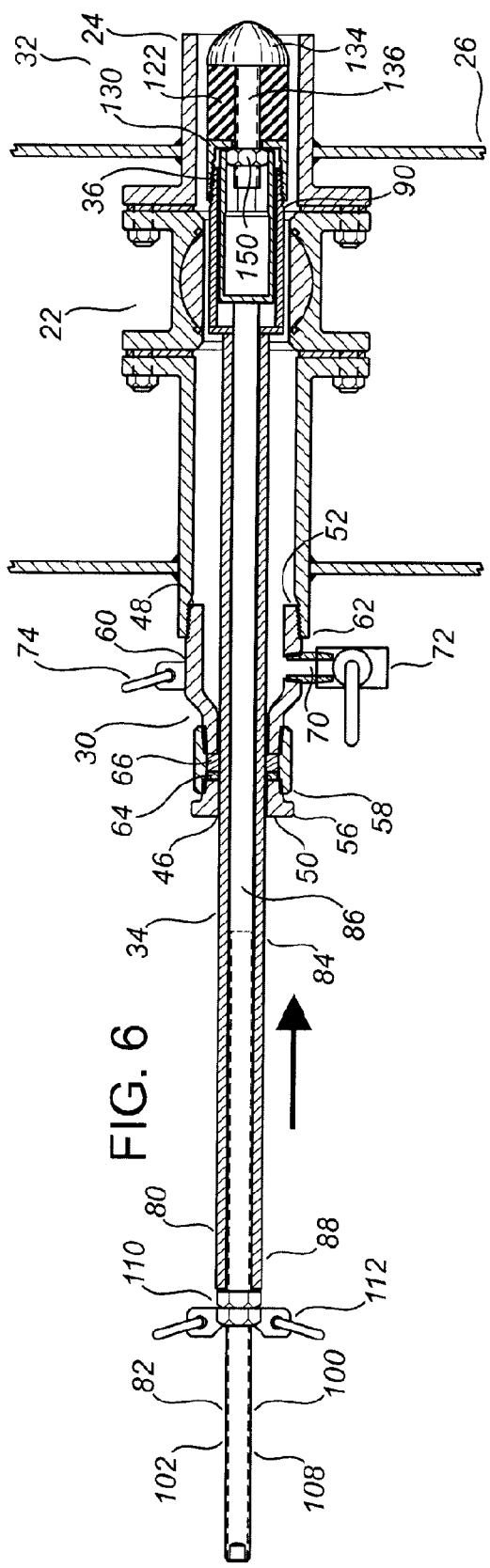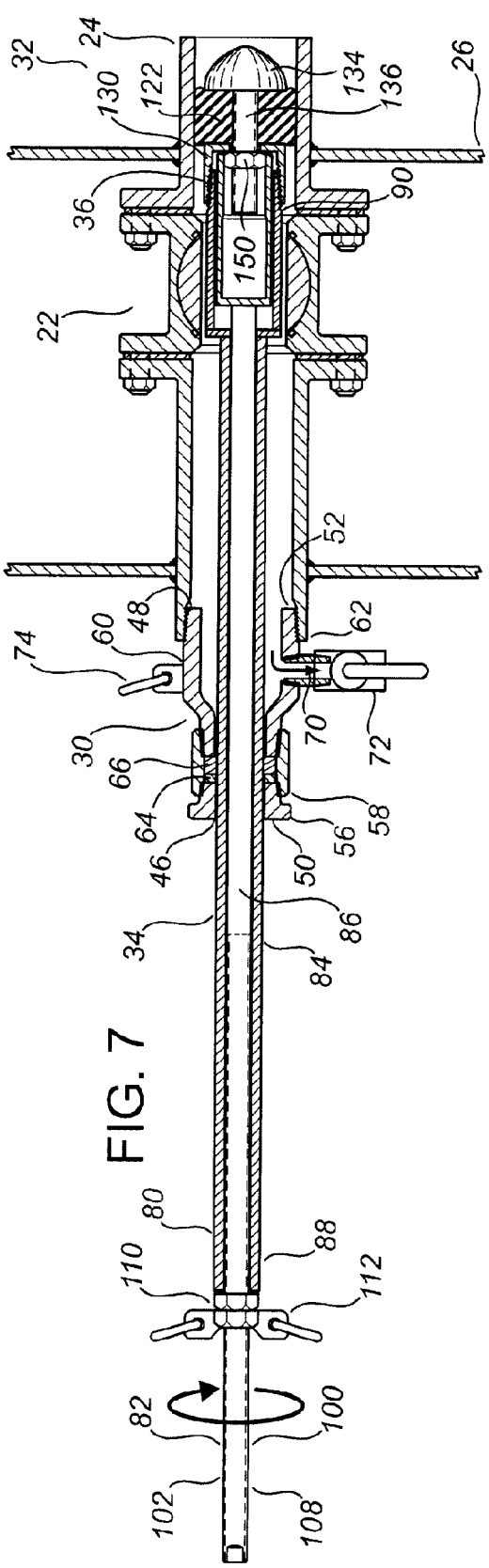

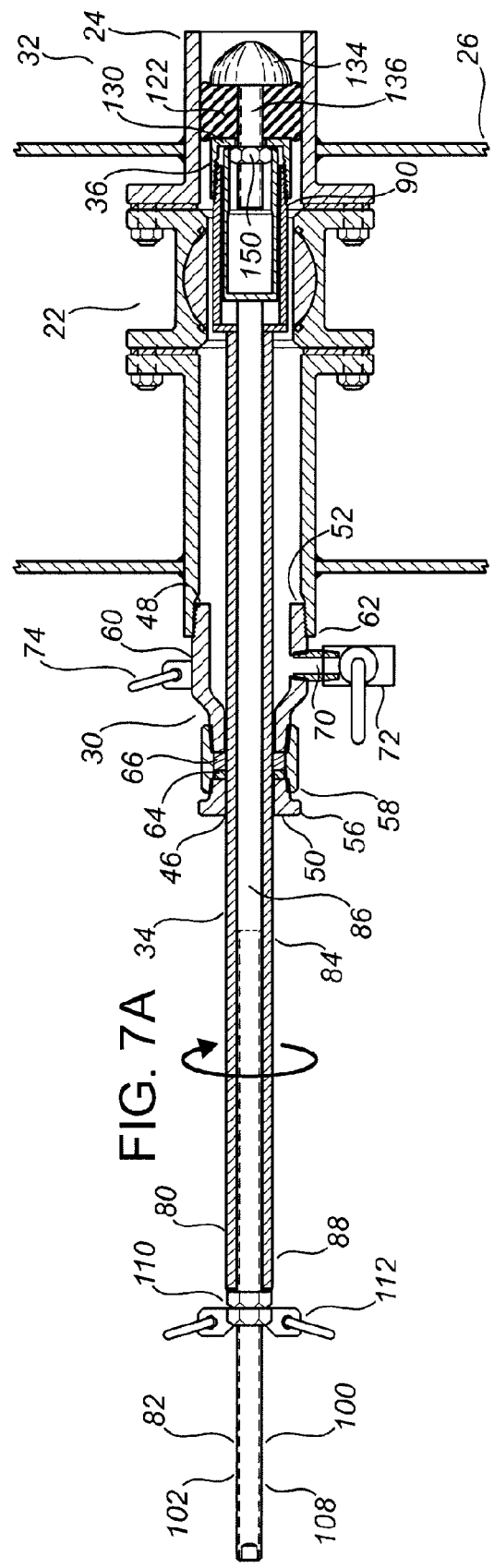

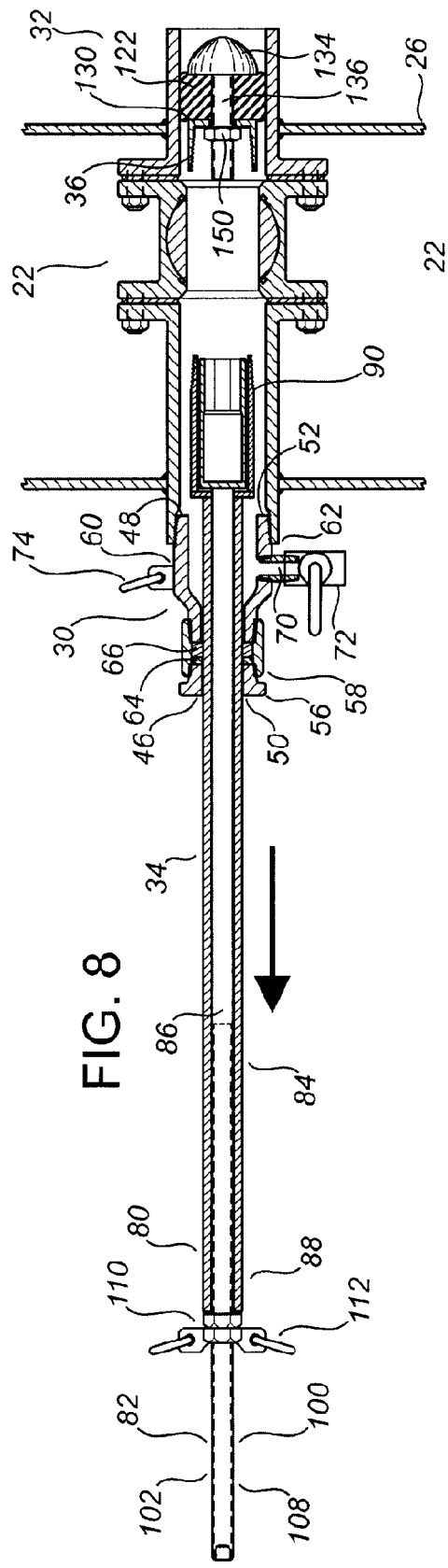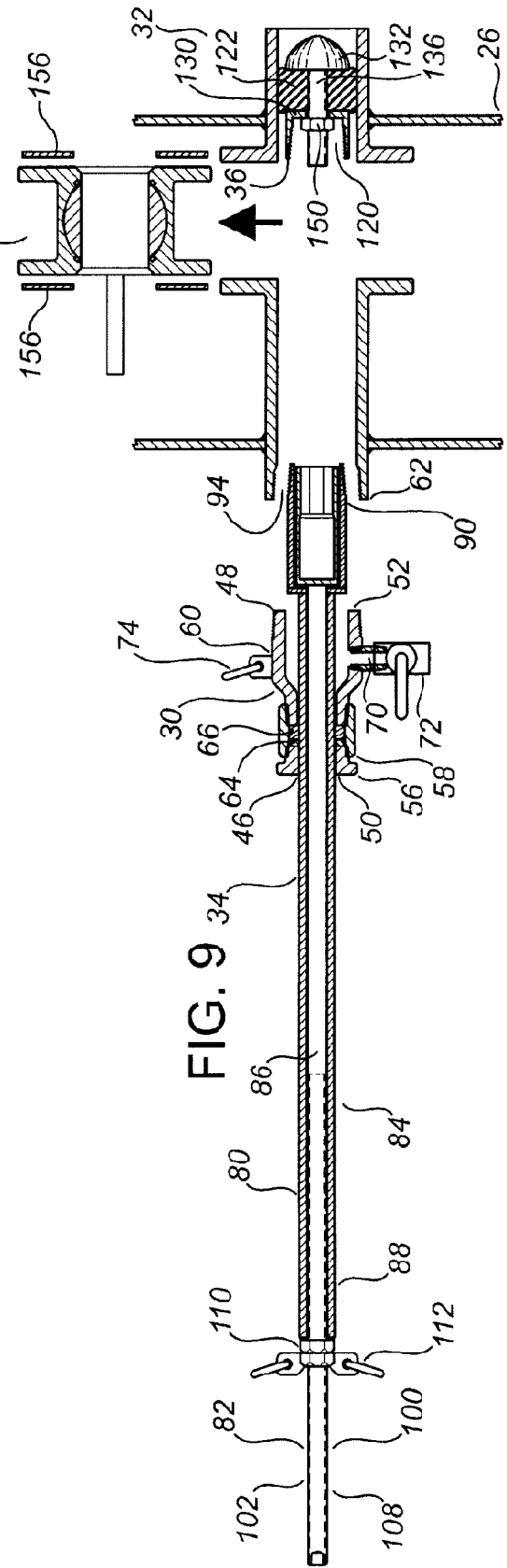

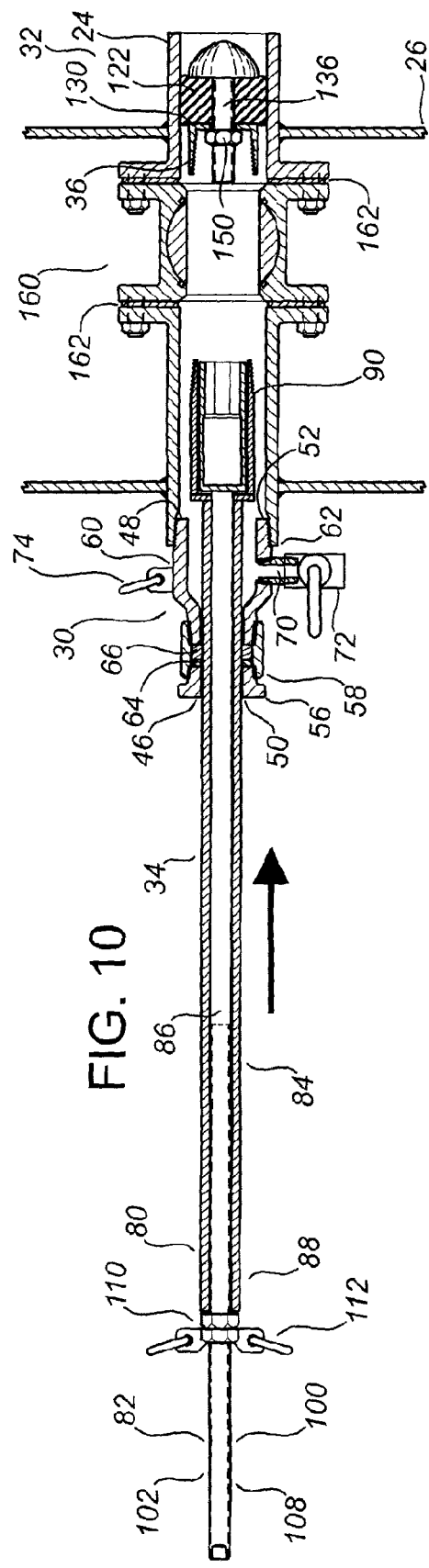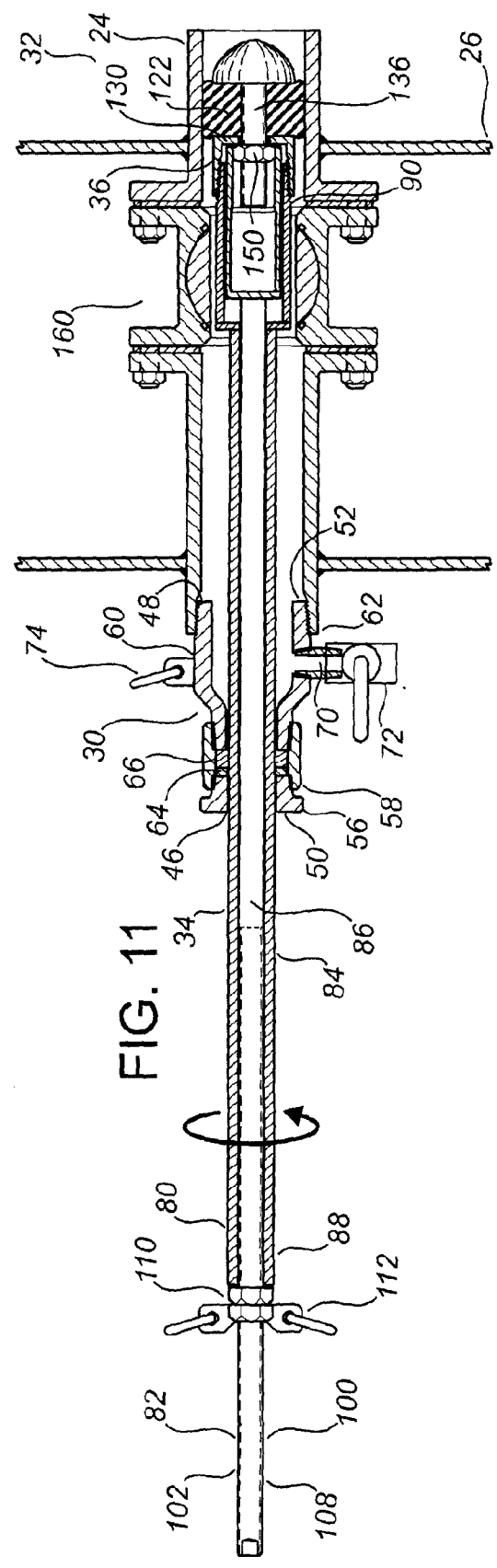

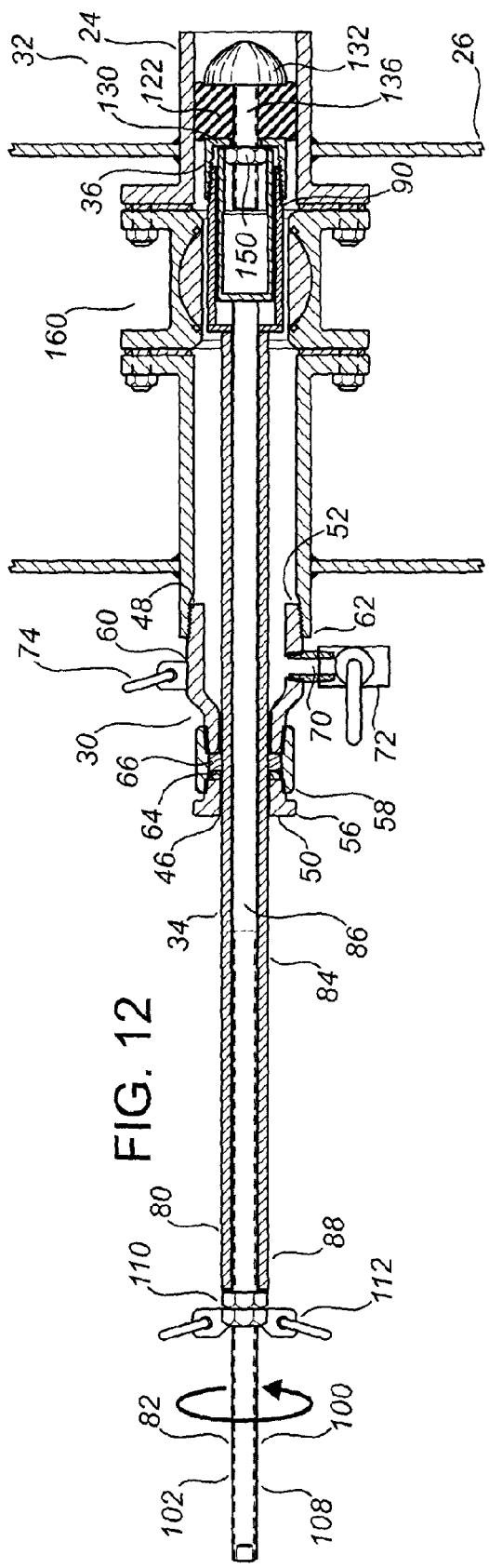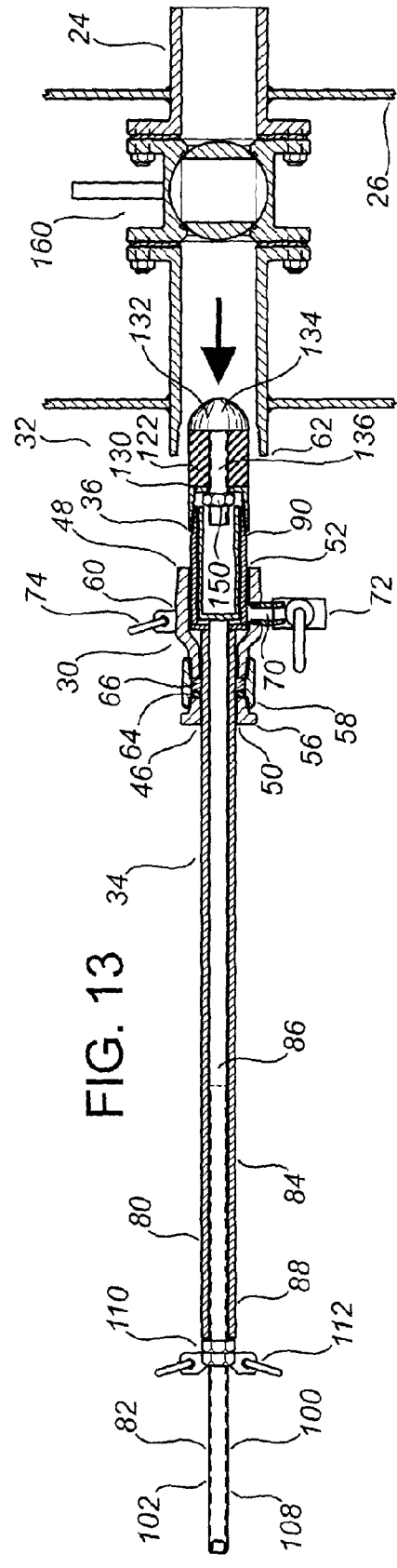

APPARATUS AND A METHOD FOR SEALING A CONDUIT

TECHNICAL FIELD

An apparatus and a method for selectively sealing a conduit in order to facilitate maintenance or repair of the conduit or its associated fittings.

BACKGROUND OF THE INVENTION

Conduits such as pipes frequently contain fluids, which may be at a pressure greater than ambient pressure. The fluids and the pressure may be maintained within a conduit by one or more fittings such as valves which are associated with the conduit. If such fittings are removed or become compromised, leakage of fluid and/or pressure from the conduit may result.

A conduit as described above may be associated with any source of fluid and/or pressure. In some circumstances, the conduit may be in fluid communication with a storage tank, such as an oil storage tank, so that the fluid in the conduit originates from the storage tank and the pressure in the conduit is due to the pressure head of the fluid within the storage tank.

A conduit installation may include a conduit and its associated fittings. In order to perform maintenance or repair on a conduit installation (including replacement of fittings), it is desirable to avoid a loss of fluid and/or pressure from the conduit.

A first option is to remove the source of fluid and/or pressure by disconnecting the conduit from the source of fluid and/or pressure or by draining a storage tank to which the conduit may be connected. This first option may be effective in eliminating or reducing fluid and/or pressure leakage, but is potentially time consuming, inconvenient and expensive, since it may require temporarily removing equipment from operation while the conduit is maintained or repaired.

A second option is to seal the conduit upstream of the location at which the maintenance or repair is taking place so that the location of maintenance or repair is isolated from the fluid and/or pressure. This second option typically requires a seal assembly which may be delivered through the conduit to a position upstream of the location of maintenance or repair and which can be selectively actuated to temporarily seal the conduit at the desired position.

Apparatus and methods exist which enable a seal assembly to be inserted into the conduit at a position downstream of the location of maintenance or repair, to be moved upstream past the location of maintenance or repair, and to be selectively actuated to temporarily seal the conduit upstream of the location of maintenance or repair. Once the maintenance or repair is completed, the seal assembly may be selectively actuated to unseal the conduit and the seal assembly may be removed from the conduit.

Examples of such apparatus and methods may be found in U.S. Pat. No. 2,690,612 (Scott), U.S. Pat. No. 2,867,243 (Bowan), U.S. Pat. No. 3,841,355 (Laner), U.S. Pat. No. 4,597,147 (Henry), U.S. Pat. No. 5,592,965 (Rakieski), U.S. Pat. No. 6,581,620 (Babcock et al), U.S. Pat. No. 6,755,216 (Mostala), France Patent Application Publication No. FR2566873 A1 (Keriolet), France Patent Application Publication No. FR2670558 (Gillodts), and PCT International Publication No. WO 2010/112067 A1 (Ornetzeder).

Such apparatus typically include a housing which is adapted to be connected with a fitting associated with the conduit. A seal assembly carrier (typically comprising a rod and/or a tube) is typically connected to the seal assembly for conveying the seal assembly through the conduit and for actuating the seal assembly. The seal assembly carrier typically extends reciprocably through a housing bore of the housing. The housing prevents fluids from discharging from the conduit while the seal assembly is conveyed by the seal assembly carrier through the conduit and its associated fittings.

Once the seal assembly is in position and is actuated to seal the conduit, the housing can typically be removed from the fitting, since the seal assembly will prevent fluids from discharging from the conduit. Once the housing is removed from the fitting, work may be performed on the fitting and on any intermediate fittings interposed between the fitting and the seal assembly without the risk of fluids escaping from the conduit.

The seal assembly, however, is typically fixed to the seal assembly carrier so that the seal assembly carrier typically must remain attached to the seal assembly after the housing is removed from the fitting. As a result, removal of intermediate fittings from the conduit installation typically requires that the intermediate fittings be moved axially to clear the proximal end of the seal assembly carrier, which may not be possible in conduit installations in which axial movement of the intermediate fittings is restricted or not possible.

For example, in some conduit installations, the fitting to which the housing is attached is located proximally relative to the intermediate fitting and may be permanently mounted so that the fitting cannot be removed. Consequently, in such conduit installations, intermediate fittings between the permanently mounted fitting and the seal assembly will be prevented by the permanently mounted fitting from moving axially to clear the proximal end of the seal assembly carrier.

In such conduit installations, the intermediate fittings are blocked from axial movement by the permanently mounted fitting and therefore can only be removed from the conduit installation by moving the intermediate fittings transversely relative to the axis of the conduit installation. Since, however, the seal assembly carrier typically extends from the seal assembly through the intermediate fittings and into the permanently mounted fitting, the intermediate fittings are also blocked from transverse movement by the seal assembly carrier.

In such conduit installations, it would be advantageous if the seal assembly could be selectively disconnected from the seal assembly carrier when the seal assembly carrier is not required for conveying or actuating the seal assembly, so that the seal assembly carrier does not interfere with the maintenance, repair or replacement of fittings associated with the conduit.

SUMMARY OF THE INVENTION

References in this document to orientations, to operating parameters, to ranges, to lower limits of ranges, and to upper limits of ranges are not intended to provide strict boundaries for the scope of the invention, but should be construed to mean "approximately" or "about" or "substantially", within the scope of the teachings of this document, unless expressly stated otherwise.

As used herein, "proximal" and "distal" are relative to a user of the apparatus or method. As one example, "proximal" means relatively close to the user and relatively removed from the conduit with which the apparatus is used, and "distal" means relatively removed from the user and relatively close to the conduit with which the apparatus is used. As a second example, moving in a "proximal direction" means moving toward the user and away from the conduit, and moving in a "distal direction" means moving away from the user and toward the conduit.

As used herein, "downstream" and "upstream" are relative to the source of fluid which is to be contained by using the apparatus or method. As one example, in the case of a conduit and/or fitting which are connected with a storage tank such as an oil storage tank, "downstream" means relatively removed from the source of fluid (i.e., the storage tank) and "upstream" means relatively close to the source of fluid (i.e., the storage tank).

The present invention is directed at an apparatus and a method for selectively sealing a conduit in order to facilitate maintenance or repair of a conduit installation (including replacement of fittings), wherein the conduit installation includes a conduit and its associated fittings.

The apparatus of the invention comprises a housing defining a housing bore, an actuatable seal assembly adapted for sealing the conduit, a seal assembly carrier for conveying the seal assembly and for actuating the seal assembly, and an actuatable connection between the seal assembly and the seal assembly carrier.

The method of the invention comprises providing an apparatus comprising a housing, an actuatable seal assembly, a seal assembly carrier and an actuatable connection, selectively actuating the seal assembly between an unset position and a set position, selectively actuating the actuatable connection between a connected state and an unconnected state, and selectively advancing and retracting the seal assembly carrier through a housing bore of the housing.

In an exemplary apparatus aspect, the invention is an apparatus for selectively sealing a conduit comprising:

(a) a housing, the housing defining a housing bore and having a housing proximal end and a housing distal end, wherein the housing distal end is adapted to be connectable with a fitting associated with the conduit;

(b) an actuatable seal assembly adapted for sealing the conduit, wherein the seal assembly is selectively actuatable between an unset position for conveying the seal assembly through the conduit and a set position for sealing the conduit;

(c) a seal assembly carrier reciprocably extending through the housing bore, for conveying the seal assembly and for actuating the seal assembly between the unset position and the set position; and (d) an actuatable connection between the seal assembly and the seal assembly carrier, wherein the actuatable connection is selectively actuatable between a connected state in which the seal assembly is connected with the seal assembly carrier and a disconnected state in which the seal assembly is disconnected from the seal assembly carrier.

The seal assembly may be selectively actuated between the unset position and the set position in any manner. As non-limiting examples, the seal assembly may be actuated mechanically, hydraulically and/or electrically. In some embodiments, the seal assembly may be actuated by relative axial movement between one or more components of the seal assembly carrier and one or more components of the seal assembly. In some embodiments, the seal assembly may be actuated by relative rotation between one or more components of the seal assembly carrier and one or more components of the seal assembly.

The actuatable connection may be selectively actuated between the connected state and the disconnected state in any manner. As non-limiting examples, the actuatable connection may be actuated mechanically, hydraulically and/or electrically. In some embodiments, the actuatable connection may be actuated by relative axial movement between one or more components of the seal assembly carrier and one or more components of the seal assembly. In some embodiments, the actuatable connection may be actuated by relative rotation between one or more components of the seal assembly carrier and one or more components of the seal assembly.

The housing may be comprised of any suitable structure, device or apparatus which is capable of accommodating the tube within the housing bore and which is adapted to be connectable with a fitting associated with the conduit. The housing may consist of a single component, or may be comprised of a plurality of components which are connected together. In some embodiments, the fitting with which the housing is connected may be associated with the proximal end of the conduit installation so that the fitting is a relatively proximal fitting. In some embodiments, the fitting with which the housing is connected may be a permanently mounted fitting. In some embodiments, the fitting with which the housing is connected may be a permanently mounted proximal fitting.

The housing may be adapted to be connectable with the fitting in any manner which is suitable to facilitate a connection with the intended fitting. As non-limiting examples, the housing may be provided with external threads, internal threads, a flange, or a camlock coupling.

The housing bore defines two primary ports in the housing which facilitate passage of the tube through the housing bore and the housing. In some embodiments, the housing may further comprise one or more auxiliary ports which communicate with the housing bore. In some embodiments, the housing may further comprise valves which are associated with the auxiliary ports. The one or more auxiliary ports facilitate draining of the housing bore and/or introduction of fluids into the housing bore while the apparatus is connected with the conduit or its associated fitting.

In some embodiments, the housing may be further comprised of a packing in the housing bore for providing a seal between the housing and the seal assembly carrier when the seal assembly carrier is within the housing bore. The packing may be comprised of any suitable structure, device or apparatus which is effective to provide the seal while permitting reciprocation of the seal assembly carrier relative to the housing bore. In some embodiments, the housing may be further comprised of a packing ring in the housing bore for assisting in maintaining the packing within the housing bore.

The seal assembly is comprised of a seal comprising at least one seal element. In some embodiments, the seal may be comprised of a single seal element. In some embodiments, the seal may be comprised of a plurality of seal elements.

In some embodiments, a plurality of seal elements may be comprised of a proximal seal element and a distal seal element. In some embodiments, a plurality of seal elements may be comprised of a proximal seal element, a distal seal element, and one or more intermediate seal elements located between the proximal seal element and the distal seal element.

In some embodiments, a single seal element or a plurality of seal elements may be comprised of, may consist of, or may consist essentially of an elastomeric material. The elastomeric material may be any suitable natural and/or synthetic material which exhibits elastic properties. In some embodiments, the elastomeric material may be a natural and/or a synthetic rubber.

In some embodiments, a plurality of seal elements may be comprised of an elastomeric proximal seal element, an elastomeric distal seal element, and possibly one or more elastomeric intermediate seal elements.

A single seal element or a plurality of seal elements each have an unexpanded minimum diameter and an expanded maximum diameter. The unexpanded minimum diameter is the minimum diameter of the seal element when the seal assembly is in the unset position. The expanded maximum diameter is the maximum diameter of the seal element when the seal assembly is in the set position.

The ratio between the expanded maximum diameter and the unexpanded minimum diameter of a seal element may be described as an expansion ratio. In embodiments in which the seal assembly is comprised of a plurality of seal elements, the unexpanded minimum diameter of each of the seal elements may be the same or some or all of the seal elements may have different unexpanded minimum diameters. In embodiments in which the seal assembly is comprised of a plurality of seal elements, the expanded maximum diameter of each of the seal elements may be the same or some or all of the seal elements may have different expanded maximum diameters. In embodiments in which the seal assembly is comprised of a plurality of seal elements, the expansion ratios of each of the seal elements may be the same or some or all of the seal elements may have different expansion ratios.

The unexpanded minimum diameter may be any diameter which will facilitate conveying the seal element through the smallest dimension which will be encountered by the seal element during use of the apparatus. The expanded maximum diameter may be any diameter which will facilitate sealing of the largest conduit which will be required to be sealed by the seal element during use of the apparatus.

Each seal element has a seal element length. In embodiments in which the seal is comprised of a plurality of seal elements, the seal element length of each of the seal elements may be the same or some or all of the seal elements may have different seal element lengths. The seal element length of a seal element may be less than, equal to, or greater than the unexpanded minimum diameter and/or the expanded maximum diameter of the seal element.

In embodiments in which the seal is comprised of a plurality of seal elements, the seal elements are arranged end to end in the seal assembly. The seal assembly may be configured so that the proximal seal element is adjacent to the distal seal element. Alternatively, the seal assembly may be configured so that the proximal seal element and the distal seal element are separated by one or more intermediate seal elements.

In some embodiments in which the seal is comprised of a plurality of seal elements, a seal element may contact its adjacent seal element or seal elements. In some embodiments in which the seal is comprised of a plurality of seal elements, the seal assembly may be further comprised of one or more spacers. The one or more spacers may be positioned between some or all of the seal elements. In some embodiments, more than one spacer may be positioned between two seal elements. In some particular embodiments, the seal assembly may be further comprised of a spacer positioned between the proximal seal element and the distal seal element.

Each of the spacers has a spacer diameter. The spacer diameter of each of the spacers may be the same or some or all of the spacers may have different spacer diameters. The spacer diameters may be any diameter which will facilitate passing the spacer through the smallest dimension which will be encountered by the spacer during use of the apparatus.

The spacer diameter may be less than, equal to or greater than the unexpanded minimum diameter of the seal elements. In some particular embodiments, the spacer embodiment may be less than the unexpanded minimum diameter of each of the proximal seal element and the distal seal element.

In embodiments in which the seal assembly is comprised of a single seal element, the materials and dimensions which are suitable for a seal assembly comprising a plurality of seal elements may also be suitable for a seal assembly comprising a single seal element.

In some embodiments, the seal may expand radially in response to an axial setting force being applied thereto in order to actuate the seal assembly to the set position, and the seal may contract radially in response to the axial setting force being released in order to actuate the seal assembly to the unset position.

The seal has a seal proximal end and a seal distal end. In some embodiments, the seal assembly may be comprised of a proximal collar for engaging the seal proximal end. In some embodiments, the seal assembly may be comprised of a distal collar for engaging the seal distal end.

Each of the proximal collar and the distal collar may be comprised of any structure, device or apparatus which is capable of engaging with the seal in order to apply the axial setting force to the seal. The proximal collar and the distal collar may be identical or substantially identical, or may be comprised of different structures, devices or apparatus. The proximal collar and the distal collar may each consist of a single component, or may be comprised of a plurality of components which are connected together.

The proximal collar and the distal collar may engage the seal directly or indirectly. As a non-limiting example, in some embodiments, the proximal collar and/or the distal collar may be physically separated from the seal by a spacer or by a similar structure, device or apparatus.

In some embodiments, the seal assembly may be comprised of an actuatable device for actuating the seal assembly. The actuatable device may be comprised of any structure, device or apparatus which is capable of actuating the seal assembly.

In some embodiments, the actuatable device may actuate the seal assembly by moving the proximal collar and the distal collar axially relative to each other in order to apply and release the axial setting force to and from the seal. In such embodiments, the actuatable device may be comprised of any structure, device or apparatus which is capable of moving the proximal collar and the distal collar axially relative to each other in order to apply and release the axial setting force to and from the seal.

In some embodiments, the actuatable device may move linearly to move the proximal collar and the distal collar axially relative to each other. For example, in some embodiments, the actuatable device may be comprised of a jacking mechanism so that the axial setting force results directly from an axially exerted force. In some embodiments, the actuatable device may convert rotational movement to axial movement in order to move the proximal collar and the distal collar axially relative to each other. For example, in some embodiments, the actuatable device may be comprised a threaded device so that rotation of the actuatable device indirectly applies the axial setting force.

In some embodiments, the actuatable device is associated with at least one of the proximal collar and the distal collar. In some embodiments, the actuatable device may be comprised of a rotatable structure such as a threaded nut or a threaded shaft, which is compatible with a complementary structure associated with at least one of the proximal collar and the distal collar.

In some particular embodiments, the actuatable device may be comprised of a threaded seal assembly nut and the distal collar may be comprised of a threaded shaft. In such embodiments, the proximal collar may be carried on the threaded shaft and the seal assembly nut may be threaded on the threaded shaft so that the proximal collar is between the seal assembly nut and the distal collar.

The seal assembly carrier may be comprised of any structure, device or apparatus which is capable of reciprocably extending through the housing bore in order to convey the seal assembly, which is capable of selectively actuating the seal assembly between the unset position and the set position, and which is capable of selectively actuating the actuatable connection between the connected state and the disconnected state. The seal assembly carrier may be comprised of a single component or may be comprised of a plurality of components.

In some embodiments, the seal assembly carrier may be comprised of a connecting component and the actuatable connection may be provided between the connecting component and the seal assembly. The connecting component may be comprised of any structure, device or apparatus which is capable of selectively connecting with the seal assembly and which is capable of providing the actuatable connection. The connecting component may be comprised of a single part, or may be comprised of a plurality of parts. In some embodiments, the connecting component may be comprised of a connecting tube. In some embodiments, the connecting tube may define a tube bore.

In some embodiments, the actuatable connection may be actuated between the connected state and the disconnected state by manipulating the connecting component.

In some embodiments, the actuatable connection may be actuated between the connected state and the disconnected state by relative rotation between the connecting component and one or more components of the seal assembly. In some embodiments, the actuatable connection may be comprised of a threaded connection between the connecting component and one or more components of the seal assembly.

In some embodiments, the seal assembly carrier may be comprised of a seal actuating component for actuating the seal assembly. The seal actuating component may be comprised of any structure, device or apparatus which is capable of selectively actuating the seal assembly. The seal actuating component may be comprised of a single part, or may be comprised of a plurality of parts. In some embodiments, the seal actuating component may be comprised of a seal actuating member. In some embodiments, the seal actuating member may be comprised of an actuating tool for actuating the seal assembly. In some embodiments in which the seal assembly is comprised of an actuatable device, the actuating tool may interact with the actuatable device in order to actuate the seal assembly.

In some embodiments, the seal assembly may be actuated between the unset position and the set position by relative rotation between the seal actuating component and one or more components of the seal assembly.

In some embodiments in which the seal assembly is actuated in response to an axial setting force being applied thereto, the axial setting force may by applied and released by manipulating the seal actuating component and/or by relative rotation between the seal actuating component and one or more components of the seal assembly.

In some embodiments in which the seal assembly carrier is comprised of a connecting tube and a seal actuating member, the seal actuating member may be configured to fit within the tube bore.

In some embodiments, the actuating tool may be comprised of a wrench. In some embodiments in which the actuatable device is comprised of a seal assembly nut, the wrench may engage the seal assembly nut so that the seal assembly is actuated between the unset position and the set position by rotation of the seal assembly nut by the wrench.

The seal assembly carrier has a carrier proximal end and a carrier distal end. In some embodiments, the seal assembly may be associated with the carrier distal end such that the seal assembly protrudes from the housing distal end. In some embodiments, the carrier proximal end may protrude from the housing proximal end.

In some embodiments, the seal assembly may be actuated from the unset position to the set position by relative rotation between one or more components of the seal assembly carrier and one or more components of the seal assembly in a first rotational direction, and the actuatable connection may be actuated from the connected state to the disconnected state by relative rotation between one or more components of the seal assembly carrier and one or more components of the seal assembly in a second rotational direction which is opposite to the first rotational direction, in order to reduce the risk that actuating the seal assembly to the set position will result in actuating the actuatable connection to the disconnected state. In other embodiments, the directions of relative rotation required to actuate the seal assembly to the set position and to actuate the actuatable connection to the disconnected state may be the same.

In some embodiments, the seal assembly may be actuated from the set position to the unset position by relative rotation between one or more components of the seal assembly carrier and one or more components of the seal assembly in the second rotational direction, and the actuatable connection may be actuated from the disconnected state to the connected state by relative rotation between one or more components of the seal assembly carrier and one or more components of the seal assembly in the first rotational direction, in order to reduce the risk that actuating the actuatable connection to the connected state will result in actuating the seal assembly to the set position. In other embodiments, the directions of relative rotation required to actuate the seal assembly to the unset position and to actuate the actuatable connection to the connected state may be the same.

In some embodiments, the first rotational direction may be rotation of one or more components of the seal assembly carrier to the left relative to the seal assembly, and the first rotational direction may be rotation of one or more components of the seal assembly to the right relative to the seal assembly.

In some embodiments, the first rotational direction may be rotation of one or more components of the seal assembly carrier to the right relative to the seal assembly, and the first rotational direction may be rotation of one or more components of the seal assembly to the left relative to the seal assembly.

In an exemplary method aspect, the invention is a method of selectively sealing a conduit comprising:

(a) providing an apparatus comprising:
  (i) a housing, the housing defining a housing bore and having a housing proximal end and a housing distal end, wherein the housing distal end is adapted to be connectable with a fitting associated with the conduit;
  (ii) an actuatable seal assembly adapted for sealing the conduit, wherein the seal assembly is selectively actuatable between an unset position for conveying the seal assembly through the conduit and a set position for sealing the conduit;
  (iii) a seal assembly carrier reciprocably extending through the housing bore, for conveying the seal assembly and for actuating the seal assembly between the unset position and the set position; and
  (iv) an actuatable connection between the seal assembly and the seal assembly carrier, wherein the actuatable connection is selectively actuatable between a connected state in which the seal assembly is connected with the seal assembly carrier and a disconnected state in which the seal assembly is disconnected from the seal assembly carrier; wherein the apparatus is provided with the seal assembly in the unset position and with the actuatable connection in the connected state;
(b) connecting the housing distal end with the fitting;
(c) advancing the seal assembly carrier through the housing bore in order to position the seal assembly at a desired location in the conduit;
(d) actuating the seal assembly to the set position in order to seal the conduit;
(e) actuating the actuatable connection to the disconnected state to disconnect the seal assembly from the seal assembly carrier; and
(f) retracting the seal assembly carrier through the housing bore while leaving the seal assembly in the set position in the conduit.

In some embodiments, the exemplary embodiment of the method may further comprise, after (f):
  (g) advancing the seal assembly carrier relative to the housing in order to engage the seal assembly carrier with the seal assembly;
  (h) actuating the actuatable connection to the connected state in order to connect the seal assembly with the seal assembly carrier;
  (i) actuating the seal assembly to the unset position in order to unseal the conduit; and
  (j) retracting the seal assembly carrier through the housing bore in order to remove the seal assembly from the conduit.

The method of the invention may be performed using any apparatus which is comprised of a housing, an selectively actuatable seal assembly, a seal assembly carrier, and a selectively actuatable actuatable connection. In some embodiments, the method of the invention may be performed using an apparatus according to the various apparatus embodiments of the invention.

In the method of the invention, the seal assembly may be actuated between the unset position and the set position in any manner which enables the seal assembly to be selectively actuated, and the actuatable connection may be actuated between the connected state and the disconnected state in any manner which enables the actuatable connection to be selectively actuated.

In some embodiments of the method of the invention, actuating the seal assembly between the unset position and the set position may be comprised of rotating one or more components of the seal assembly carrier relative to one or more components of the seal assembly.

In some embodiments of the method of the invention, actuating the actuatable connection between the connected state and the disconnected state may be comprised of rotating one or more components of the seal assembly carrier relative to one or more components of the seal assembly.

In some embodiments of the method of the invention, actuating the seal assembly to the set position may be comprised of rotating one or more components of the seal assembly carrier relative to one or more components of the seal assembly in a first rotational direction, and actuating the actuatable connection to the disconnected state may be comprised of rotating one or more components of the seal assembly carrier relative to one or more components of the seal assembly in a second rotational direction which is opposite to the first rotational direction.

In some embodiments of the method of the invention, actuating the seal assembly to the unset position may be comprised of rotating one or more components of the seal assembly carrier relative to one or more components of the seal assembly in a second rotational direction, and wherein actuating the actuatable connection to the connected state may be comprised of rotating one or more components of the seal assembly carrier relative to one or more components of the seal assembly in a first rotational direction which is opposite to the second rotational direction.

In some embodiments of the method of the invention, the first rotational direction may be rotation of one or more components of the seal assembly carrier to the left relative to the seal assembly, and the first rotational direction may be rotation of one or more components of the seal assembly to the right relative to the seal assembly.

In some embodiments of the method of the invention, the first rotational direction may be rotation of one or more components of the seal assembly carrier to the right relative to the seal assembly, and the first rotational direction may be rotation of one or more components of the seal assembly to the left relative to the seal assembly.

In some embodiments of the method of the invention, the method may be further comprised of disconnecting the housing distal end from the fitting after (j).

In some embodiments of the method of the invention, the method may be further comprised of removing an intermediate fitting associated with the conduit after (f), wherein the intermediate fitting is interposed between the fitting and the conduit. In some embodiments, the fitting, the intermediate fitting and the conduit may define a conduit installation axis. In some embodiments, the fitting may be permanently mounted so that the fitting cannot be removed to facilitate removal of the intermediate fitting by axial movement along the conduit installation axis. In some embodiments, the intermediate fitting may be removed by moving the intermediate fitting transversely relative to the conduit installation axis.

In some embodiments of method of the invention, the intermediate fitting may be inspected, serviced and/or repaired and then reinstalled before (g). In some embodiments, the intermediate fitting may be replaced with a replacement fitting before (g).

The intermediate fitting may be comprised of any type of fitting which may be included in the conduit installation. In some embodiments of the method of the invention, the intermediate fitting may be a valve and the replacement fitting may be a replacement valve.

BRIEF DESCRIPTION OF DRAWINGS

Embodiments of the invention will now be described with reference to the accompanying drawings, in which:

FIG. 4 is a longitudinal section view of the exemplary embodiment of the apparatus depicted in FIG. 1, a valve, a conduit, and a fitting, showing the housing of the apparatus in preparation for being connected with the fitting, and showing the valve fully closed.

FIG. 5 is a longitudinal section view of the exemplary embodiment of the apparatus depicted in FIG. 1, a valve, a conduit, and a fitting, showing the housing of the apparatus connected with the fitting, and showing the seal assembly contacting the fully closed valve.

FIG. 6 is a longitudinal section view of the exemplary embodiment of the apparatus depicted in FIG. 1, a valve, a conduit, and a fitting, showing the housing of the apparatus connected with the fitting, and showing the seal assembly carrier being advanced through the housing bore in the distal direction with the valve fully open.

FIG. 7 is a longitudinal section view of the exemplary embodiment of the apparatus depicted in FIG. 1, a valve, a conduit, and a fitting, showing the housing of the apparatus connected with the fitting, and showing the seal assembly being actuated to the set position by manipulating the seal assembly carrier.

FIG. 7A is a longitudinal section view of the exemplary embodiment of the apparatus depicted in FIG. 1, a valve, a conduit, and a fitting, showing the housing of the apparatus connected with the fitting, and showing the actuatable connection being actuated to the disconnected state by manipulating the seal assembly carrier.

FIG. 8 is a longitudinal section view of the exemplary embodiment of the apparatus depicted in FIG. 1, a valve, a conduit, and a fitting, showing the housing of the apparatus connected with the fitting, showing the seal assembly disconnected from the seal assembly carrier, showing the seal assembly carrier being retracted through the housing bore in the proximal direction, showing the seal assembly positioned in the conduit in the set position, and showing the valve fully open.

FIG. 9 is a longitudinal section view of the exemplary embodiment of the apparatus depicted in FIG. 1, a valve, a conduit, and a fitting, showing the housing of the apparatus disconnected from the fitting, showing the seal assembly positioned in the conduit in the set position, and showing the valve being moved transversely relative to the conduit installation axis in order to remove the valve from the conduit installation.

FIG. 10 is a longitudinal section view of the exemplary embodiment of the apparatus depicted in FIG. 1, a replacement valve, a conduit, and a fitting, showing the housing of the apparatus connected with the fitting, showing the seal assembly carrier being advanced through the housing bore in the distal direction, showing the seal assembly positioned in the conduit in the set position, and showing the replacement valve fully open.

FIG. 11 is a longitudinal section view of the exemplary embodiment of the apparatus depicted in FIG. 1, a replacement valve, a conduit, and a fitting, showing the housing of the apparatus connected with the fitting, showing the seal assembly carrier contacting the seal assembly, showing the actuatable connection being actuated to the connected state by manipulating the seal assembly carrier.

FIG. 12 is a longitudinal section view of the exemplary embodiment of the apparatus depicted in FIG. 1, a replacement valve, a conduit, and a fitting, showing the housing of the apparatus connected with the fitting, showing the seal assembly connected with the seal assembly carrier, and showing the seal assembly being actuated to the unset position by manipulating the seal assembly carrier.

FIG. 13 is a longitudinal section view of the exemplary embodiment of the apparatus depicted in FIG. 1, a replacement valve, a conduit, and a fitting, showing the housing of the apparatus disconnected from the fitting, showing the seal assembly connected with the seal assembly carrier, showing the seal assembly carrier retracted through the housing bore in the proximal direction, and showing the replacement valve fully closed.

DETAILED DESCRIPTION

The present invention is directed at an apparatus for sealing a conduit in order to facilitate maintenance and/or repair of a conduit installation, wherein the conduit installation includes the conduit and its associated fittings.

A non-limiting exemplary embodiment of the apparatus is depicted in FIGS. 1-13. In the exemplary embodiment, the apparatus (20) may be used to replace an intermediate fitting such as a valve (22) which is associated with a conduit (24) in a conduit installation. The conduit (24) is in fluid communication with a source of fluid. The source of fluid may be a storage tank, such as an oil storage tank (26). The conduit installation and the source of fluid do not form part of the invention.

Figure 1:
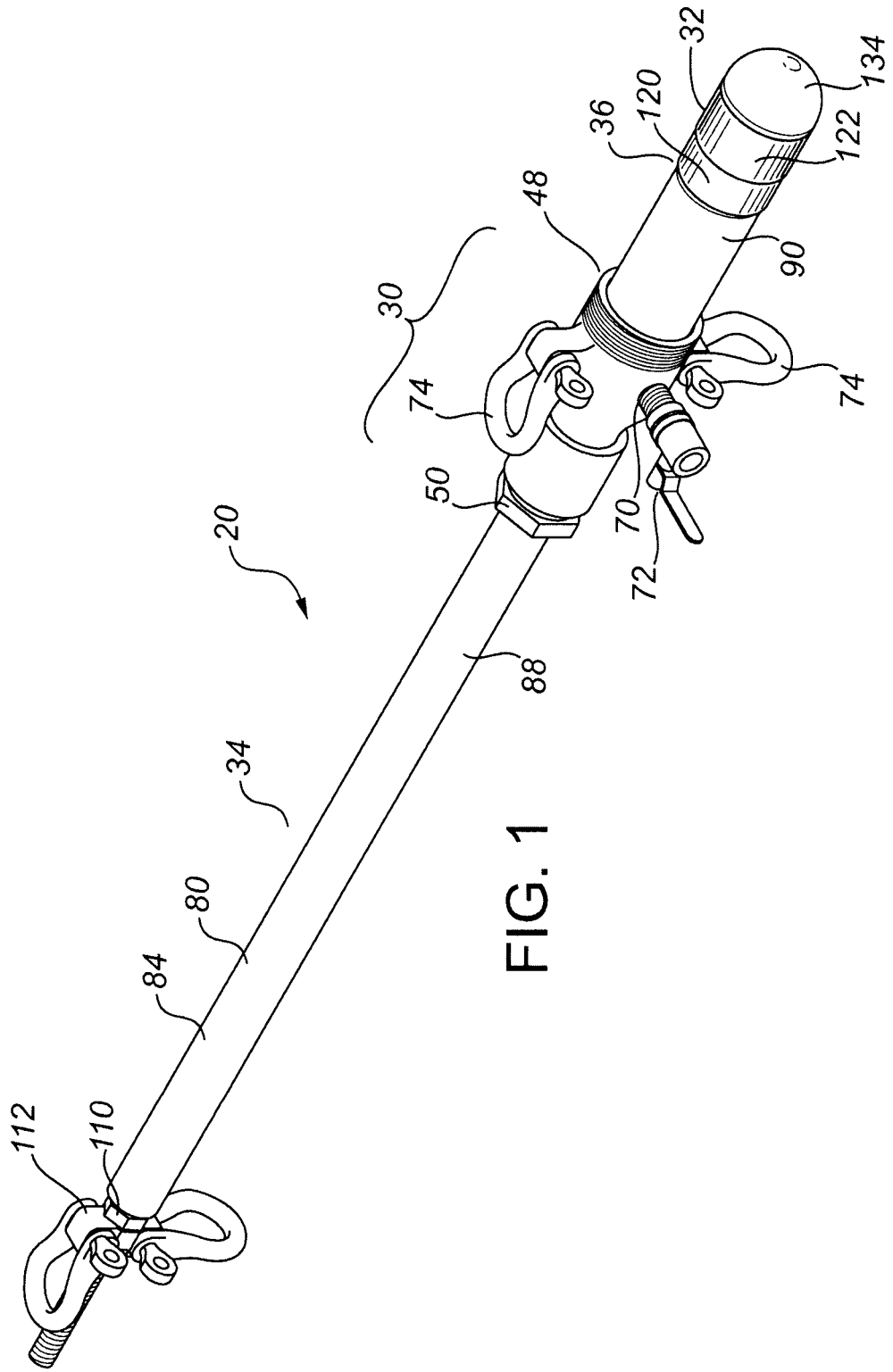
FIG. 1 is a pictorial view of an apparatus in accordance with an exemplary embodiment of the apparatus of the invention, showing the seal assembly carrier retracted through the housing bore in the proximal direction, and showing the seal assembly connected with the seal assembly carrier.
Figure 2:
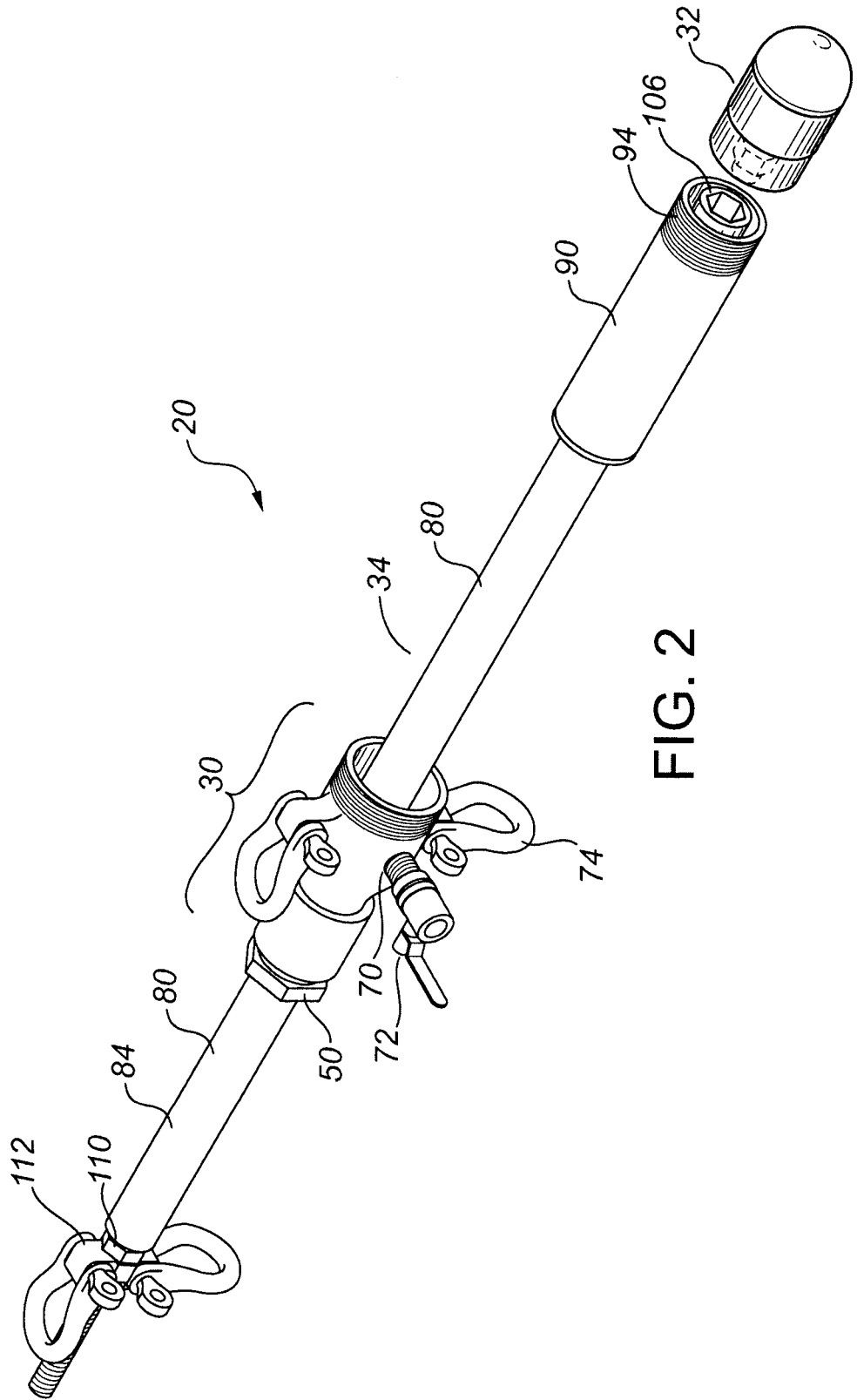
FIG. 2 is a pictorial view of an apparatus in accordance with an exemplary embodiment of the apparatus of the invention, showing the seal assembly carrier advanced through the housing bore in the distal direction, and showing the seal assembly disconnected from the seal assembly carrier.
Figure 3:
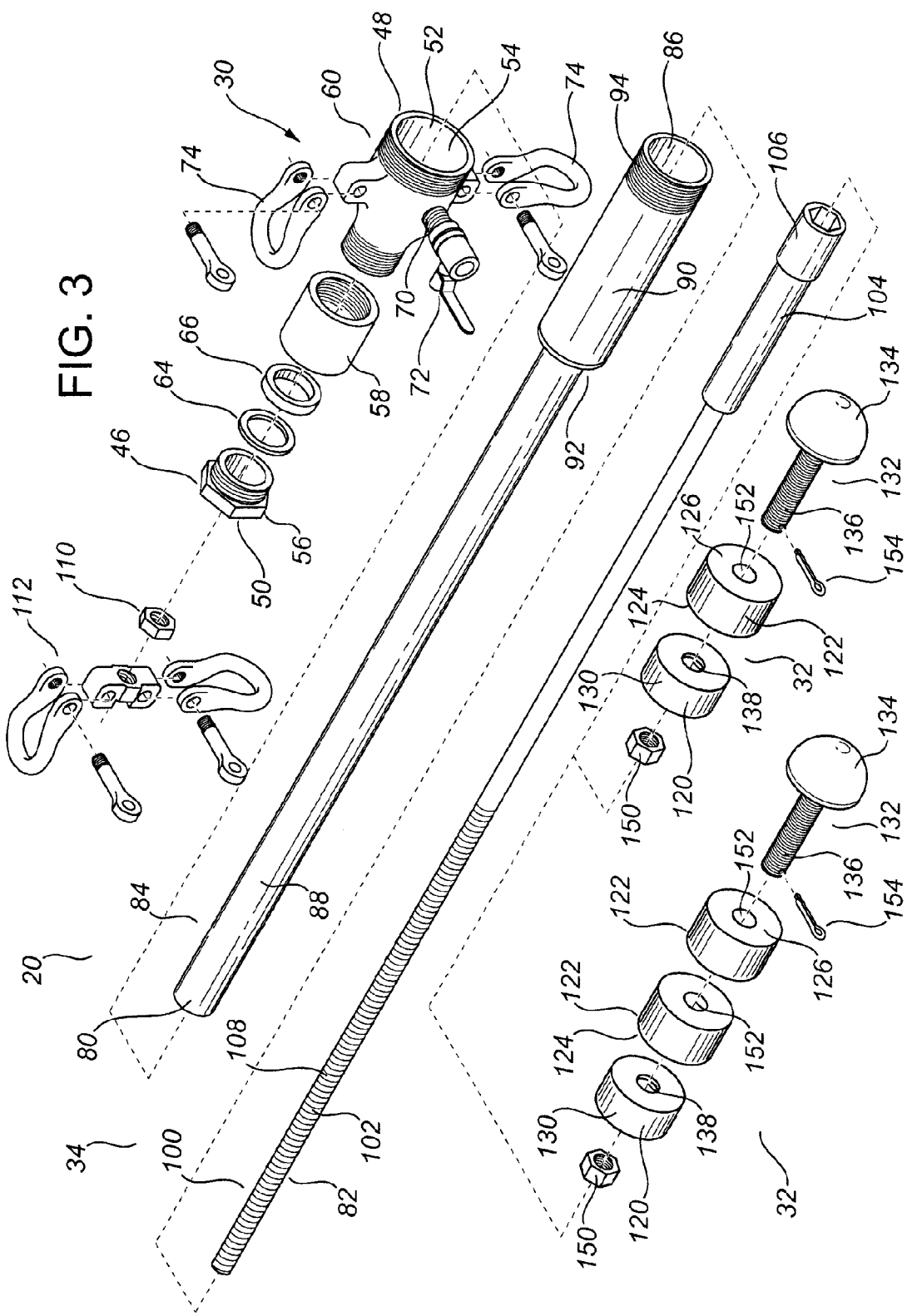
FIG. 3 is an exploded pictorial view of the exemplary embodiment of the apparatus depicted in FIG. 1, showing the components of the apparatus unassembled, and showing both a first exemplary embodiment and a second exemplary embodiment of the seal assembly.

Referring to FIGS. 1-3, the apparatus (20) is comprised of a housing (30), an actuatable seal assembly (32), a seal assembly carrier (34), and an actuatable connection (36) between the seal assembly (32) and the seal assembly carrier (34).

The seal assembly (32) is adapted to seal the conduit (24) and is selectively actuatable between an unset position for conveying the seal assembly (32) and a set position for sealing the conduit (24). In the exemplary embodiment, the seal assembly (32) is actuatable between the unset position and the set position by relative rotation between one or more components of the seal assembly carrier (34) and one or more components of the seal assembly (32).

The purpose of the seal assembly carrier (34) is to convey the seal assembly (32) to and through the conduit (24) and to actuate the seal assembly (32) between the unset position and the set position.

The actuatable connection (36) is selectively actuatable between a connected state in which the seal assembly (32) is connected with the seal assembly carrier (34) and a disconnected state in which the seal assembly (32) is disconnected from the seal assembly carrier (34). In the exemplary embodiment, the actuatable connection (36) is actuatable between the connected state and the disconnected state by relative rotation between one or more components of the seal assembly carrier (34) and one or more components of the seal assembly (32).

The housing (30) has a housing proximal end (46) and a housing distal end (48). A housing bore (54) extends through the housing (30) from the housing proximal end (46) to the housing distal end (48), thereby defining a housing proximal primary port (50) at the housing proximal end (46) and a housing distal primary port (52) at the housing distal end (48).

In the exemplary embodiment, the housing (30) is constructed from a plurality of components which are temporarily or permanently connected together. Moving from the housing proximal end (46) toward the housing distal end (48), the housing (30) is comprised of a hexagonal plug (56), a packing coupling (58), and a threaded crossover coupling (60).

In the exemplary embodiment, the crossover coupling (60) includes external threads which are selected to be compatible with internal threads in a fitting (62) which is included in the conduit installation so that the housing (30) is thereby adapted to be connectable with the fitting (62). In other embodiments, the crossover coupling (60) may include an alternative form of coupling which is compatible with the fitting (62) such as, by way of non-limiting examples, internal threads, a flange or a camlock coupling. In the exemplary embodiment, the fitting (62) is located proximally relative to the valve (22) in the conduit installation and may be a permanently mounted fitting.

In the exemplary embodiment, the crossover coupling (60) provides a transition between the relatively larger diameter of the fitting (62) and the relatively smaller diameter of the packing coupling (58). In the exemplary embodiment, the crossover coupling (60) is welded to the packing coupling (58).

In the exemplary embodiment, the packing coupling (58) contains a suitable packing (64) and a packing ring (66). The packing (64) provides a seal between the housing (30) and the seal assembly carrier (34). The packing ring (66) abuts the packing (64) and assists in maintaining the packing (64) in place inside the packing coupling (58). In the exemplary embodiment, the packing (64) consists of Teflon (trademark), which allows the seal assembly carrier (34) to slide smoothly through the packing coupling (58) while maintaining the seal between the housing (30) and the seal assembly carrier (34). In the exemplary embodiment, the packing ring (66) is an annular steel washer. Internal threads are provided in the packing coupling (58) to accommodate the hexagonal plug (56). In the exemplary embodiment, the packing coupling (58) may have a nominal size of about 2 inches (about 5 centimeters) and the packing (64) may have a thickness of about 0.25 inches (about 0.6 centimeters).

In the exemplary embodiment, the hexagonal plug (56) includes exterior threads so that the hexagonal plug (56) can be threadably coupled with the packing coupling (58). When coupled with the packing coupling (58), the hexagonal plug (56) abuts the packing (64). As a result, the hexagonal plug (56) assists the packing coupling (58) in maintaining a seal between the housing (30) and the seal assembly carrier (34) by providing support for the packing ring (66) and containment of the packing (64) within the packing coupling (58). In the exemplary embodiment, the hexagonal plug (56) may have a nominal size of about 2 inches (about 5 centimeters) to fit within the packing coupling (58) and may have a 1.75 inch (about 4.4 centimeters) hole machined through it to accommodate the seal assembly carrier (34).

In the exemplary embodiment, the housing (30) further comprises an auxiliary port (70) having an auxiliary port valve (72). The auxiliary port (70) communicates with the housing bore (54). In the exemplary embodiment, the auxiliary port (70) is located on the crossover coupling (60). In the exemplary embodiment, the auxiliary port (70) may have a nominal diameter of about 1 inch (about 2.5 centimeters).

In the exemplary embodiment, the housing (30) further comprises two clevises (74) which are spaced 180 degrees apart, adjacent to the threads on the crossover coupling (60). In the exemplary embodiment, the clevises (74) are welded to the crossover coupling (60).

In the exemplary embodiment, the seal assembly carrier (34) is configured to reciprocably extend through the housing bore (54). In the exemplary embodiment, the seal assembly carrier (34) is comprised of a connecting component (80) and a seal actuating component (82). The actuatable connection (36) is provided between the connecting component (80) and the seal assembly. The seal actuating component (82) actuates the seal assembly (32).

In the exemplary embodiment, the connecting component (80) is comprised of a connecting tube (84) which defines a tube bore (86). Referring to FIG. 3, in the exemplary embodiment, the connecting tube (84) is comprised of a proximal tube (88) and a distal tube (90).

The distal tube (90) is larger in diameter and shorter than the proximal tube (88). In the exemplary embodiment, the distal tube (90) may have an outer diameter of about 2.875 inches (about 7.3 centimeters) and a length of about 9.75 inches (about 24.8 centimeters). In the exemplary embodiment, the proximal tube (88) may have an outer diameter of about 1.65 inches (about 4.2 centimeters), an inner diameter of about 1.1 inches (about 2.8 centimeters), and a length of about 39 inches (about 99 centimeters). In the exemplary embodiment, a washer (92) having an outer diameter of about 3 inches (about 7.6 centimeters) and an inner diameter of about 1.1 inches (about 2.8 centimeters) is interposed between the proximal tube (88) and the distal tube (90), and the proximal tube (88), the washer (92) and the distal tube (90) are welded together to provide the connecting tube (84).

The distal end of the distal tube (90) is comprised of external threads (94). In the exemplary embodiment, the external threads (94) provide one-half of a threaded connection with the seal assembly (32), which threaded connection provides the actuatable connection (36). In the exemplary embodiment, the external threads (94) are right-handed threads so that rotation of the connecting tube (84) to the right relative to the seal assembly (32) will cause the actuatable connection (36) to be actuated to the connected state, and so that rotation of the connecting tube (84) to the left relative to the seal assembly (32) will cause the actuatable connection (36) to be actuated to the disconnected state.

In the exemplary embodiment, the seal actuating component (82) is comprised of a seal actuating member (100) which is configured to fit within the tube bore (84). Referring to FIG. 3, in the exemplary embodiment, the seal actuating member (100) is comprised of a proximal member (102) and a distal member (104).

The distal member (104) is larger in diameter and shorter than the proximal member (102). In the exemplary embodiment, the distal member (104) may have an outer diameter of about 1.9 inches (about 4.8 centimeters) and a length of about 9.5 inches (about 24.1 centimeters). In the exemplary embodiment, the distal end of the distal member (104) may be comprised of an actuating tool (106) comprising a 1 inch socket wrench 1.5 inches deep, which may be welded to the distal end of the distal member (104). In the exemplary embodiment, the proximal member (102) may be comprised of a rod having a diameter of about 1 inch (about 2.5 centimeters) and a length of about 44 inches (about 112 centimeters). In the exemplary embodiment, the proximal member (102) and the distal member (104) are welded together to provide the seal actuating member (100).

The proximal end of the proximal member (102) is threaded with external threads (108) which are configured to accept a 1 inch (about 2.5 centimeters) threaded carrier nut (110) and a 1 inch (about 2.5 centimeters) threaded dual clevis (112). In the exemplary embodiment, the external threads (108) are right-handed threads so that the carrier nut (110) and the dual clevis (112) are threaded onto the external threads (108) by rotation to the right relative to the proximal member (102). When the carrier nut (110) and the dual clevis (112) are threaded onto the external threads (108) and are tightened against each other, they "lock" to the proximal member (108) so that rotation of the carrier nut (110) will cause rotation of the seal actuating member (100).

In the exemplary embodiment, the proximal member (102) is longer than the proximal tube (88), so that the proximal end of the proximal member (102) protrudes from a proximal end of the proximal tube (88). This enables the carrier nut (110) and the dual clevis (112) to be threaded onto the external threads (108) when the seal actuating member (100) is positioned within the tube bore (86).

When the seal actuating member (100) is positioned within the tube bore (86) and the carrier nut (110) and dual clevis (112) are threaded onto the external threads (108) on the seal actuating member (100), the seal actuating member (100) is prevented from being separated from the connecting tube (84) in one direction by the washer (92) and in the other direction by the carrier nut (110) and the dual clevis (112). Furthermore, when the seal actuating member (100) is positioned within the tube bore (86), the seal actuating member (100) and the connecting tube (84) are capable of being rotated relative to each other.

Referring to FIGS. 3-4, the proximal end of the seal assembly (32) is comprised of internal threads (120). In the exemplary embodiment, the internal threads (120) on the seal assembly (120) and the external threads (94) on the distal end of the distal tube (90) provide the actuatable connection (36). In the exemplary embodiment, the internal threads (120) and the external threads (94) are right-handed threads so that rotation of the connecting tube (84) to the right relative to the seal assembly (32) will cause the actuatable connection (36) to be actuated to the connected state, and so that rotation of the connecting tube (84) to the left relative to the seal assembly (32) will cause the actuatable connection (36) to be actuated to the disconnected state.

The seal assembly (32) is comprised of a seal. In a first exemplary embodiment of the seal assembly (32) as depicted in FIG. 3, the seal is comprised of a single seal element (122). In a second exemplary embodiment of the seal assembly (32) as depicted in FIG. 3, the seal is comprised of two seal elements (122). The second exemplary embodiment of the seal assembly (32) may be used in circumstances where the conduit (24) to be sealed is relatively long in length. The first exemplary embodiment of the seal assembly (32) may be used in all circumstances, but is particularly advantageous where the conduit (24) to be sealed is relatively short in length. In other embodiments of the seal assembly (32), the seal may be comprised of more than two seal elements (122), which may be particularly advantageous where the conduit (24) to be sealed is long enough to accommodate a seal with an extended length.

The seal, comprising one or more seal elements (122), has a seal proximal end (124) and a seal distal end (126). In the second exemplary embodiment of the seal assembly (32), the seal elements (122) contact each other (without any intervening spacer or spacers).

In the first and second exemplary embodiments of the seal assembly (32), the seal expands radially in response to an axial setting force being applied thereto in order to actuate the seal assembly (32) to the set position, and the seal contracts radially in response to the axial setting force being released in order to actuate the seal assembly (32) to the unset position.

In the first and second exemplary embodiments of the seal assembly (32), the seal assembly is further comprised of a proximal collar (130) for engaging the seal proximal end (124) and a distal collar (132) for engaging the seal distal end (126). In the first and second exemplary embodiments of the seal assembly (32), the proximal collar (130) engages the seal proximal end (124) directly (without any intervening spacer) and the distal collar (132) engages the seal distal end (126) directly (without any intervening spacer). The proximal collar (130) and the distal collar (132) are moved axially relative to each other in order to apply and release the axial setting force.

In the first and second exemplary embodiments of the seal assembly (32), the distal collar (132) is comprised of a solid plug (134) which has a generally rounded distal end to facilitate conveying the seal assembly (32) through the conduit (24) and a flat proximal end to facilitate engagement with the seal distal end (126). The distal collar (132) is further comprised of a threaded shaft (136) which extends from the flat proximal end of the distal collar. In the first and second exemplary embodiments of the seal assembly (32), the threaded shaft (136) may be welded to the plug (134) or may be machined from the plug (134).

In the first and second exemplary embodiments of the seal assembly (32), the proximal collar (130) is comprised of a tubular collar which has an open proximal end and a flat distal end to facilitate engagement with the seal proximal end (124). The flat distal end of the proximal collar (130) defines a central bore (138) which is configured to enable the proximal collar (130) to be carried on the threaded shaft (136) of the distal collar (132). The open proximal end of the proximal collar (130) includes the internal threads (120). In the first and second exemplary embodiments of the seal assembly (32), the proximal collar (130) may be constructed from a short length of pipe which is welded to a washer.

In the first and second exemplary embodiments of the seal assembly (32), the seal assembly (32) is further comprised of a threaded seal assembly nut (150) which is configured to be compatible with the threads on the threaded shaft (136) of the distal collar (132) so that the seal assembly nut (150) can be threaded onto the threaded shaft (136). In the first and second exemplary embodiments of the seal assembly (32), the threaded shaft (136) and the seal assembly nut (150) have complementary left-handed threads, so that rotation of the seal assembly nut (150) to the left relative to the threaded shaft (150) will cause the seal assembly nut (150) to advance axially along the threaded shaft (136) toward the plug, and rotation of the seal assembly nut (150) to the right relative to the threaded shaft (150) will cause the seal assembly nut (150) to retract axially along the threaded shaft (150) toward the proximal end of the threaded shaft (150).

In the first and second exemplary embodiments of the seal assembly (32), each of the seal elements (122) defines a central bore (152) which is configured to enable the seal elements (122) to be carried on the threaded shaft (136) of the distal collar (132).

In order to assemble the seal assembly (32), the one or more seal elements (122), followed by the proximal collar (130) are passed over the threaded shaft (136), and the seal assembly nut (150) is then threaded onto the threaded shaft (136). A cotter pin (154) is then inserted through a transverse hole (156) through the end of the threaded shaft (136) in order to prevent the seal assembly nut (150) from separating from the threaded shaft (136).

The seal assembly nut (150) provides an actuatable device for moving the proximal collar (130) and the distal collar (132) axially relative to each other, since movement of the seal assembly nut (150) axially along the threaded shaft (136) will cause the proximal collar (130) to move along the threaded shaft (136). The seal assembly nut (150) is configured to be compatible with the actuating tool (106) of the seal actuating member (100), comprising the socket wrench, so that the socket wrench can engage the seal assembly nut (150) in order to actuate the seal assembly (32). Since the threaded shaft (136) and the seal assembly nut (150) have left-handed threads, rotation of the seal actuating member (100) to the left will cause the seal assembly (32) to be actuated to the set position, and rotation of the seal actuating member (100) to the right will cause the seal assembly (32) to be actuated to the unset position.

In the first exemplary embodiment of the seal assembly (32), the plug has an outer diameter of about 3.6 inches (about 9.1 centimeters) and a length of about 1.6 inches (about 4.1 centimeters), and the threaded shaft has an outer diameter of about 1 inch (about 2.5 centimeters) and a length of about 3.6 inches (about 9.1 centimeters), so that the distal collar (132) has a total length of about 5.2 inches (about 13.2 centimeters). In the first exemplary embodiment of the seal assembly, the proximal collar (130) has an outer diameter of about 3.6 inches (about 9.1 centimeters), an inner diameter of about 1.1 inches (about 2.8 centimeters), and a length of about 1.1 inches (about 2.8 centimeters). In the first exemplary embodiment of the seal assembly, the seal element (122) has an outer diameter of about 3.6 inches (about 9.1 centimeters), an inner diameter of about 0.9 inches (about 2.3 centimeters), and a seal element length of about 2 inches (about 5.1 centimeters). In the first exemplary embodiment of the seal assembly (32), the cotter pin (154) has a length of about 1.5 inches (about 3.8 centimeters).

In the second exemplary embodiment of the seal assembly (32), the plug has an outer diameter of about 3 inches (about 7.6 centimeters) and a length of about 1.6 inches (about 4.1 centimeters), and the threaded shaft has an outer diameter of about 1 inch (about 2.5 centimeters and a length of about 6.5 inches (about 16.5 centimeters), so that the distal collar (132) has a total length of about 8.1 inches (about 20.6 centimeters). In the second exemplary embodiment of the seal assembly, the proximal collar (130) has an outer diameter of about 3.35 inches (about 8.5 centimeters), an inner diameter of about 1.1 inches (about 2.8 centimeters), and a length of about 1.5 inches (about 3.8 centimeters). In the second exemplary embodiment of the seal assembly, each of the seal elements (122) has an outer diameter of about 3.35 inches (about 8.5 centimeters), an inner diameter of about 0.9 inches (about 2.3 centimeters), and a seal element length of about 2 inches (about 5.1 centimeters). In the second exemplary embodiment of the seal assembly (32), the cotter pin (154) has a length of about 1.5 inches (about 3.8 centimeters).

Referring to FIGS. 3-13, in some applications an apparatus comprising a housing (30), an actuatable seal assembly (32), a seal assembly carrier (34) and an actuatable connection (36) may be used to change an intermediate fitting in a conduit installation. In such applications, the intermediate fitting may be a valve (22) which is removably connected between a conduit (24) leading from a storage tank, such as an oil storage tank (not shown) and a relatively proximal fitting (62) which may be permanently mounted as part of the conduit installation. In such applications, it may be desirable to have the ability to change the valve (22) without first draining the storage tank and/or without completely dismantling the conduit installation.

In some applications, the conduit installation may be associated with an oil storage tank having a valve and spill containment system (not shown) of the general type described in U.S. Pat. No. 5,960,826 (Hebblethwaite et al). As a non-limiting example, the intermediate valve (22) may correspond generally to the outlet valve which is designated as "42" and the fitting (62) may correspond generally to the bull plug which is designated as "50" in FIG. 2 of U.S. Pat. No. 5,960,826 (Hebblethwaite et al). As non-limiting examples, in such applications the fitting (62) may be located within the secondary chamber which is designated as "32" or may be located in the outer tank wall which is designated as "28" in U.S. Pat. No. 5,960,826 (Hebblethwaite et al).

The following description is of a method of using an apparatus (20) according to the exemplary apparatus embodiment for such applications, with reference to FIGS. 4-13.

In some applications, other valves and/or fittings (not shown) positioned close to the conduit installation may interfere with the method and use of the apparatus (20). In such circumstances, it may be desirable (if possible) to remove such valves and/or fittings and replace them with plugs or blinds before performing the method. For example, some oil storage tanks may be provided with an oil load valve which communicates with an upper end of the oil storage tank. If the fluid level in the oil storage tank is below the level at which the oil load valve communicates with the oil storage tank the oil load valve may be removed and replaced with a plug or blind without risk of fluid escaping from the tank.

In most applications, it is desirable to flush the conduit installation with water before performing the method, in order to remove or at least loosen sand and other debris which may have accumulated around the valve (22). This flushing may be performed by connecting a source of water with the fitting (62), opening the valve (22), and passing water upstream through the conduit installation.

First, referring to FIG. 3, the apparatus (20) is assembled for use. The housing (30) may be assembled by connecting the auxiliary port valve (72) with the auxiliary port (70). The seal assembly (32) may be assembled by placing the seal element (122) or seal elements (122) and the proximal collar (130) in sequence onto the threaded shaft (136), threading the seal assembly nut (150) onto the threaded shaft (136) by rotating the seal assembly nut (150) to the left, and then installing the cotter pin (154) on the threaded shaft (136). The seal assembly carrier (34) may be assembled by inserting the seal actuating member (100) into the connecting tube (84), threading the carrier nut (110) onto the external threads (108) on the proximal end of the seal actuating member (100) by rotating the carrier nut (110) to the right until the carrier nut (110) contacts the proximal end of the connecting tube (84), backing the carrier nut (110) off about one full turn to the left, threading the dual clevis (112) onto the external threads (108) by rotating the dual clevis (112) to the right until it contacts the carrier nut (110), and then tightening the carrier nut (110) and the dual clevis (112) against each other in order to "lock" them in place on the seal actuating member (100). The actuatable connection (36) may be actuated to the connected state by connecting the internal threads (120) on the seal assembly (32) with the external threads (94) on the distal end of the connecting tube (84) and then rotating the connecting tube (84) to the right relative to the seal assembly (32). The proximal end of the seal assembly carrier (34) may then be inserted into the housing distal primary port (52) and extending the seal assembly carrier (34) through the housing bore (54).

Second, the valve (22) is closed or the valve (22) is inspected to confirm and ensure that it is closed.

Third, referring to FIG. 4, the housing (30) is connected directly or indirectly with the fitting (62), such as by threading the housing (30) onto complementary threads on the fitting (62). If the fitting (62) is provided with a plug (not shown) or other structure, the plug or other structure is removed before the housing (30) is connected with the fitting (62).

Fourth, referring to FIG. 5, the seal assembly carrier (34) is advanced through the housing bore (54) in a distal direction to convey the seal assembly (32) until the seal assembly (32) contacts the closed valve (22), with the seal assembly (32) in the unset position. The position of the seal assembly carrier (34) relative to the housing bore (54) is noted and the additional distance which the seal assembly carrier (34) must be advanced in order to convey the seal assembly (32) past the valve (22) and into a desired position in the conduit (22) is marked in some manner on the seal assembly carrier (34). For example, a pair of vice grips may be fastened onto the connecting tube (84) to mark the additional distance which is required.

Fifth, two come-along devices (not shown) may be attached and snugged up between the two clevises (74) on the housing (30) and the dual clevis (112) which is threaded onto the seal actuating member (100).

Sixth, referring to FIG. 6, the valve (22) is opened and the seal assembly carrier (34) is advanced further through the housing bore (54) in order to convey the seal assembly (32) the additional distance to the desired position of the seal assembly (32) relative to the conduit (22). If necessary, the come-along devices may be actuated to pull the seal assembly carrier (34) through the housing bore (54) if the conduit installation remains plugged with sand or other debris.

Seventh, a strap (not shown) may optionally be connected between the housing (30) and the seal assembly carrier (34) to prevent the seal assembly carrier (34) from being pushed back through the housing bore (54) by hydrostatic pressure within the storage tank.

Eighth, referring to FIG. 7, the carrier nut (110) is engaged with a wrench and is rotated to the left in order to turn the seal actuating member (100) and actuate the seal assembly (32) to the set position by turning of the seal assembly nut (150) by the actuating tool (106). The actuation of the seal assembly (32) to the set position may be confirmed by the number of rotations of the seal actuating member (100) and/or by the torque which is applied by the wrench.

Ninth, referring to FIG. 7A and FIG. 8, the connecting tube (84) is rotated to the left with a tool such as a pipe wrench in order to actuate the actuatable connection (36) to the disconnected state, thereby releasing the seal assembly carrier (34) from the seal assembly (32), and the seal assembly carrier (34) is retracted through the housing bore (54) until it is downstream (i.e., proximal) to the valve (22). The seal assembly (32) is thus in the set position within the conduit (24) in order to seal the conduit (24), and the seal assembly carrier (34) is clear of the valve (22) so that the seal assembly carrier (34) will not interfere with the removal of the valve (22).

Tenth, the auxiliary port valve (72) is opened to drain the housing bore (54). Referring to FIG. 9, the housing (30) may be removed from the fitting (62) or may remain attached to the fitting (62) with the seal assembly carrier (34) retracted in the housing bore (54).

Eleventh, referring to FIG. 9, the valve (22) is removed from the conduit installation. In some applications in which the valve (22) is interposed between the conduit (24) and the fitting (62), the valve (22) and its adjacent structures may include flanges and fasteners (i.e., studs and nuts) to secure the valve (22) within the conduit installation. In such applications, the valve (22) may be unfastened and one or more flange spreaders (not shown) may be used to separate the flanges on the valve (22) from adjacent flanges so that any gaskets (156) associated with the flanges can be removed. Once the gaskets (156) are removed, the valve (22) can be removed from the conduit installation by moving the valve (22) transversely relative to the conduit installation axis. In other applications in which the valve (22) is secured within the conduit installation in some other manner, other steps may be required in order to remove the valve (22) from the conduit installation. In any case, because the seal assembly carrier (34) is disconnected from the seal assembly (32) and is thus clear of the valve (22), the valve (22) may be moved transversely without interference from the seal assembly carrier (34).

Twelfth, the conduit installation downstream (i.e., proximal) of the seal assembly (32) is cleaned to remove sand and other debris and to prepare the flanges or other structures which were adjacent to the valve (22) for the installation of a replacement valve (160).

Thirteenth, the replacement valve (160) and replacement gaskets (162) are moved transversely relative to the conduit installation axis in order to position the replacement valve (160) and the replacement gaskets (162) within the conduit installation. If necessary, one or more flange spreaders may be used to provide sufficient space to position the replacement valve (160) and the replacement gaskets (162) within the conduit installation. If the replacement valve (160) is to be secured within the conduit installation with fasteners, holes in the flanges may be lined up to accept studs, studs may be inserted into the holes, and nuts may be threaded onto the studs to secure the replacement valve (160) within the conduit installation. The replacement valve (160) is installed so that it is open.

Fourteenth, the housing (30) and the seal assembly carrier (34) and their components, including in particular the external threads (94) on the connecting tube (84), are cleaned to prepare them for removal of the seal assembly (32) from the conduit (24). If the housing (30) was removed from the fitting (62) following actuation of the seal assembly (32) to the set position and actuation of the actuatable connection (36) to the disconnected state, the housing (30) is reconnected with the fitting (62).

Fifteenth, referring to FIGS. 10-12, the seal assembly carrier (34) is advanced through the housing bore (54) and the replacement valve (160) until the actuating tool (106) contacts the seal assembly nut (150). The seal actuating member (100) is rotated to the left until the seal actuating member (100) advances further and the actuating tool (106) engages the seal assembly nut (150). The connecting tube (84) is then advanced further and rotated to the right with a tool such as a pipe wrench in order to actuate the actuatable connection (36) to the connected state. The actuation of the actuatable connection (36) to the connected state may be confirmed by the number of rotations of the connecting tube (84) and/or by the torque which is applied by the pipe wrench. The seal actuating member (100) is then rotated to the right in order to actuate the seal assembly (32) to the unset position so that the seal assembly (32) can be removed from the conduit (24). The seal assembly carrier (34) is then retracted through the housing bore (54) until the seal assembly (32) clears the replacement valve (160).

Sixteenth, referring to FIG. 13, the replacement valve (160) is closed, the housing (30) is removed from the fitting (62), and the apparatus (20) is cleaned. The fitting (62) is then restored to its initial condition, which may include reinstalling a plug or other structure in the fitting (62).

If valves and/or fittings positioned close to the conduit installation were removed and replaced with plugs or blinds in preparation for the performance of the method, the valves and/or fittings may be reinstalled in order to restore the storage tank to its initial condition.

In this document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be one and only one of the elements.

The embodiments of the invention in which an exclusive property or privilege is claimed are defined as follows:

1. An apparatus for selectively sealing a conduit comprising:
   (a) a housing, the housing defining a housing bore and having a housing proximal end and a housing distal end, wherein the housing distal end is adapted to be connectable with a fitting associated with the conduit;
   (b) an actuatable seal assembly adapted for sealing the conduit, wherein the seal assembly has a proximal end and wherein the seal assembly is selectively actuatable between an unset position for conveying the seal assembly through the conduit and a set position for sealing the conduit;
   (c) a seal assembly carrier reciprocably extending through the housing bore, wherein the seal assembly carrier is comprised of:
      (i) a connecting tube for connecting with the seal assembly in order to convey the seal assembly through the conduit, wherein the connecting tube has a distal end and wherein the connecting tube defines a tube bore; and
      (ii) a seal actuating member positioned within the tube bore, wherein the seal assembly is actuated between the unset position and the set position by rotating the seal actuating member relative to the seal assembly; and
   (d) an actuatable connection between the seal assembly and the connecting tube, wherein the actuatable connection is comprised of a threaded connection between the seal assembly and the connecting tube, wherein the threaded connection is comprised of external threads on the distal end of the connecting tube and internal threads on the proximal end of the seal assembly, so that the actuatable connection is selectively actuatable between a connected state in which the seal assembly is connected with the seal assembly carrier and a disconnected state in which the seal assembly is disconnected from the seal assembly carrier by rotating the connecting tube relative to the seal assembly.

2. The apparatus as claimed in claim 1 wherein the seal assembly is comprised of a seal comprising at least one seal element, wherein the seal expands radially in response to an axial setting force being applied thereto in order to actuate the seal assembly to the set position, and wherein the seal contracts radially in response to the axial setting force being released in order to actuate the seal assembly to the unset position, and wherein the axial setting force is applied and released by rotating the seal actuating member relative to the seal assembly.

3. The apparatus as claimed in claim 1 wherein the seal actuating member is comprised of an actuating tool for actuating the seal assembly.

4. The apparatus as claimed in claim 3 wherein the seal has a seal proximal end and a seal distal end, wherein the seal assembly is further comprised of a proximal collar for engaging the seal proximal end, wherein the seal assembly is further comprised of a distal collar for engaging the seal distal end, wherein the seal assembly is further comprised of an actuatable device for moving the proximal collar and the distal collar axially relative to each other, and wherein the actuatable device is actuated by the actuating tool.

5. The apparatus as claimed in claim 4 wherein the actuatable device is comprised of a threaded seal assembly nut, wherein the actuating tool is comprised of a wrench which is configured to engage the seal assembly nut, and wherein the seal assembly is actuated between the unset position and the set position by rotation of the seal assembly nut by the wrench.

6. The apparatus as claimed in claim 5 wherein the distal collar is comprised of a threaded shaft, wherein the proximal collar is carried on the threaded shaft, and wherein the seal assembly nut is threaded on the threaded shaft so that the proximal collar is between the seal assembly nut and the distal collar.

7. The apparatus as claimed in claim 1 wherein the seal assembly carrier has a carrier proximal end and a carrier distal end, wherein the seal assembly is associated with the carrier distal end such that the seal assembly protrudes from the housing distal end, and wherein the carrier proximal end protrudes from the housing proximal end.

8. The apparatus as claimed in claim 1 wherein the seal assembly is actuated from the unset position to the set position by rotating the seal actuating member relative to the seal assembly in a first rotational direction, and wherein the actuatable connection is actuated from the connected state to the disconnected state by rotating the connecting tube relative to the seal assembly in a second rotational direction which is opposite to the first rotational direction.

9. A method of selectively sealing a conduit comprising:
   (a) providing an apparatus comprising:
      (i) a housing, the housing defining a housing bore and having a housing proximal end and a housing distal end, wherein the housing distal end is adapted to be connectable with a fitting associated with the conduit;
      (ii) an actuatable seal assembly adapted for sealing the conduit, wherein the seal assembly has a proximal end and wherein the seal assembly is selectively actuatable between an unset position for conveying the seal assembly through the conduit and a set position for sealing the conduit;

(iii) a seal assembly carrier reciprocably extending through the housing bore, wherein the seal assembly carrier is comprised of:

(A) a connecting tube for connecting with the seal assembly in order to convey the seal assembly through the conduit, wherein the connecting tube has a distal end and wherein the connecting tube defines a tube bore; and (B) a seal actuating member positioned within the tube bore wherein the seal assembly is actuated between the unset position and the set position by rotating the seal actuating member relative to the seal assembly; and (iv) an actuatable connection between the seal assembly and the connecting tube, wherein the actuatable connection is comprised of a threaded connection between the seal assembly and the connecting tube, wherein the threaded connection is comprised of external threads on the distal end of the connecting tube and internal threads on the proximal end of the seal assembly, so that the actuatable connection is selectively actuatable between a connected state in which the seal assembly is connected with the seal assembly carrier and a disconnected state in which the seal assembly is disconnected from the seal assembly carrier by rotating the connecting tube relative to the seal assembly;

wherein the apparatus is provided with the seal assembly in the unset position and with the actuatable connection in the connected state;

(b) connecting the housing distal end with the fitting;

(c) advancing the seal assembly carrier through the housing bore in order to position the seal assembly at a desired location in the conduit;

(d) actuating the seal assembly to the set position in order to seal the conduit by rotating the seal actuating member relative to the seal assembly in a first rotational direction;

(e) actuating the actuatable connection to the disconnected state to disconnect the seal assembly from the seal assembly carrier by rotating the connecting tube relative to the seal assembly in a second rotational direction which is opposite to the first rotational direction; and (f) retracting the seal assembly carrier through the housing bore while leaving the seal assembly in the set position in the conduit.

10. The method as claimed in claim 9, further comprising after (f):

(g) advancing the seal assembly carrier relative to the housing in order to engage the seal assembly carrier with the seal assembly;

(h) actuating the actuatable connection to the connected state in order to connect the seal assembly with the seal assembly carrier by rotating the connecting tube relative to the seal assembly in the first rotational direction;

(i) actuating the seal assembly to the unset position in order to unseal the conduit by rotating the seal actuating member relative to the seal assembly in the second rotational direction; and (j) retracting the seal assembly carrier through the housing bore in order to remove the seal assembly from the conduit.

11. The method as claimed in claim 10, further comprising disconnecting the housing distal end from the fitting after (j).

12. The method as claimed in claim 10, further comprising removing an intermediate fitting associated with the conduit after (f), wherein the intermediate fitting is interposed between the fitting and the conduit.

13. The method as claimed in claim 12 wherein the fitting, the intermediate fitting and the conduit define a conduit installation axis and wherein the intermediate fining is removed by moving the intermediate fitting transversely relative to the conduit installation axis.

14. The method as claimed in claim 12, further comprising replacing the intermediate fitting with a replacement fitting before (g).

15. The method as claimed in claim 13 wherein the intermediate fitting is a valve and wherein the replacement fitting is a replacement valve.

* * * * *